US008502896B2

(12) United States Patent
Ono

(10) Patent No.: US 8,502,896 B2
(45) Date of Patent: Aug. 6, 2013

(54) IMAGE DEVICE THAT ACCELERATES RECONSTRUCTION PROCESS

(75) Inventor: Shuji Ono, Saitama (JP)

(73) Assignee: Fujifilm Corporation, Tokyo (JP)

( * ) Notice: Subject to any disclaimer, the term of this patent is extended or adjusted under 35 U.S.C. 154(b) by 267 days.

(21) Appl. No.: 12/968,770

(22) Filed: Dec. 15, 2010

(65) Prior Publication Data

US 2011/0149140 A1   Jun. 23, 2011

(30) Foreign Application Priority Data

Dec. 18, 2009   (JP) ................................. 2009-287529

(51) Int. Cl.
*H04N 17/00*   (2006.01)
*H04N 3/14*   (2006.01)
(52) U.S. Cl.
USPC .......................................... 348/273; 348/187
(58) Field of Classification Search
USPC .............. 348/187, 188, 222.1, 272, 273, 280
See application file for complete search history.

(56) References Cited

U.S. PATENT DOCUMENTS

| 6,226,034 | B1 * | 5/2001 | Katayama | 348/242 |
|---|---|---|---|---|
| 6,628,329 | B1 * | 9/2003 | Kelly et al. | 348/252 |
| 6,965,691 | B2 * | 11/2005 | Walmsley et al. | 382/162 |
| 7,061,650 | B2 * | 6/2006 | Walmsley et al. | 358/1.9 |
| 7,256,827 | B1 * | 8/2007 | Sato | 348/272 |
| 7,280,289 | B2 | 10/2007 | Yamakawa | |
| 7,405,890 | B2 | 7/2008 | Nakamura | |
| 7,551,373 | B2 | 6/2009 | Hirose | |
| 7,697,221 | B2 | 4/2010 | Mori | |
| 2008/0013850 | A1 | 1/2008 | Sakurai et al. | |
| 2009/0147111 | A1 | 6/2009 | Litvinov et al. | |
| 2010/0079630 | A1 | 4/2010 | Mishima et al. | |

FOREIGN PATENT DOCUMENTS

| JP | 2006-287330 | 10/2006 |
|---|---|---|
| JP | 2007-129354 | 5/2007 |
| JP | 2008-042874 | 2/2008 |
| JP | 2008-268268 | 11/2008 |
| JP | 2009-089082 | 4/2009 |
| JP | 2010-087614 | 4/2010 |

OTHER PUBLICATIONS

Japanese Official Action—2009-287529—May 28, 2013.

* cited by examiner

Primary Examiner — Timothy J Henn
(74) Attorney, Agent, or Firm — Young & Thompson

(57) ABSTRACT

An imaging device includes: a lens optical system, for focusing light from a subject; a single chip color imaging element equipped with a Bayer pattern color filter, for imaging an image of the subject focused by the lens optical system; and an image processing section, for performing a filtering process in which data output by the imaging element is passed through an image reconstructing filter having properties inverse blur properties of the optical system, and then performing a synchronization process. The image processing section collects data excluding zero elements for each of R, G, and B channels, to generate reduced data arrays in which the amount of data is ¼ for the R and B channels, and ½ for the G channel, and administers the filtering process using the image reconstruction filter onto data of the reduced data array for each of the R, G, and B channels.

2 Claims, 8 Drawing Sheets

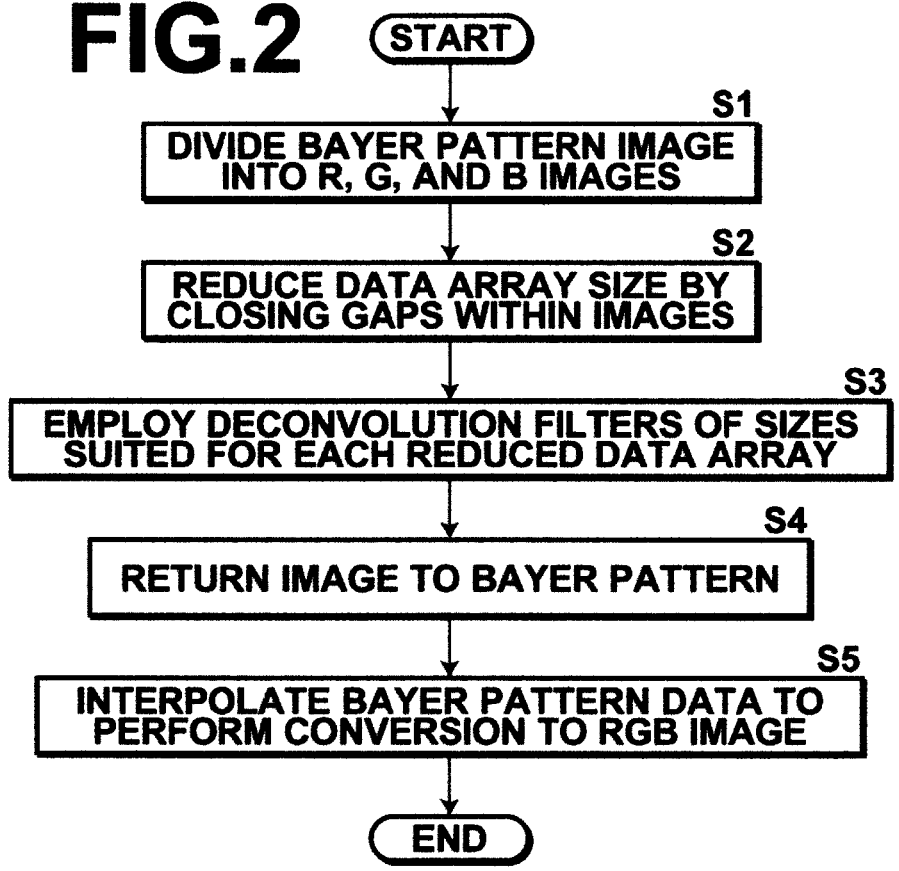
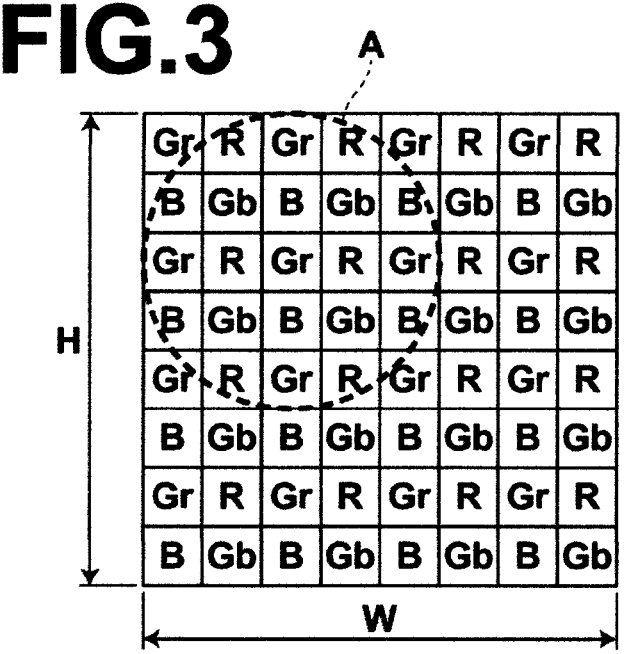

FIG.4
(1)
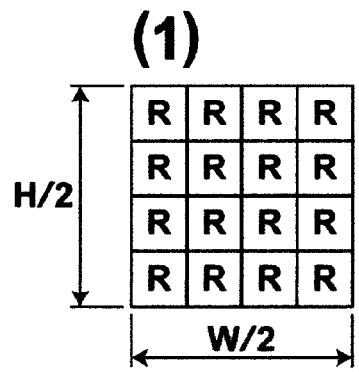
(2)
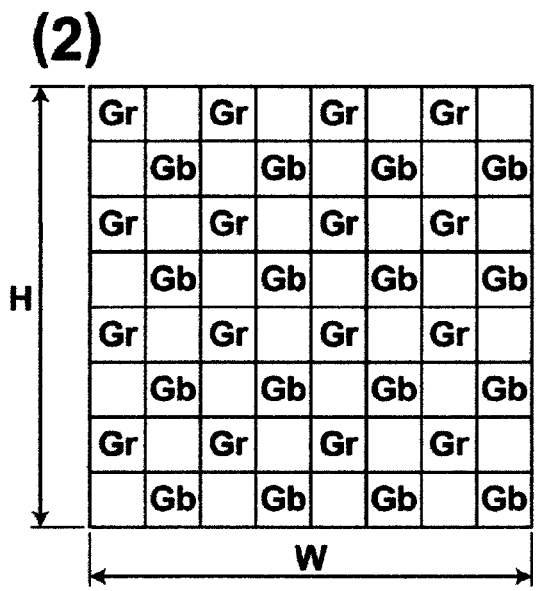
(3)
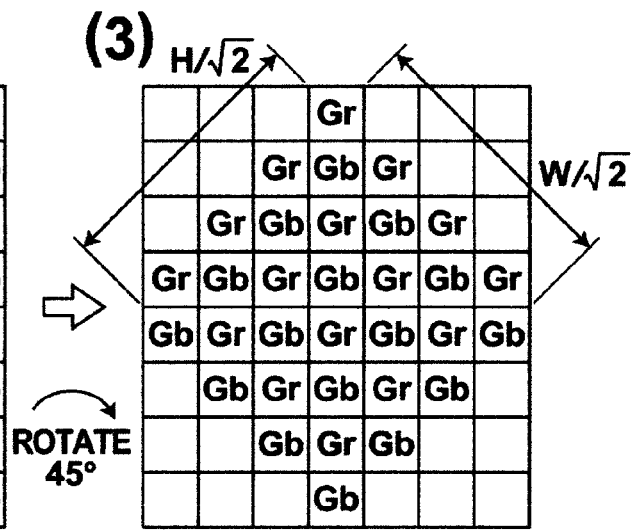
(4)
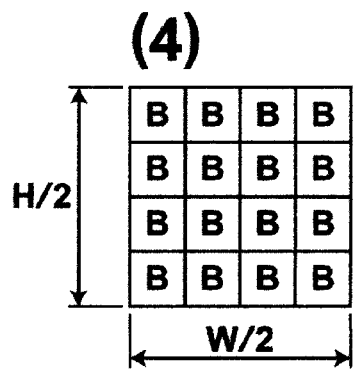

FIG.5
(1)
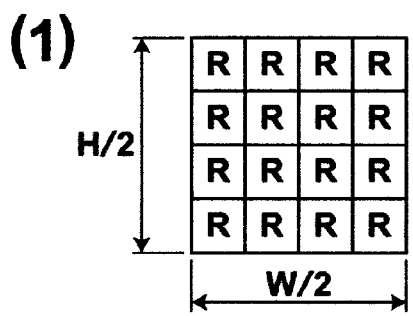
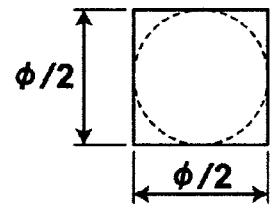
(2)
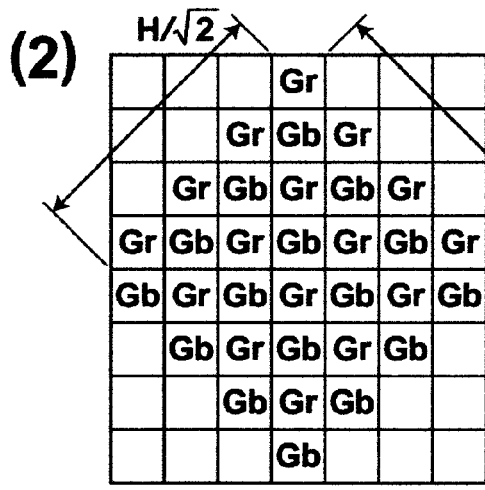
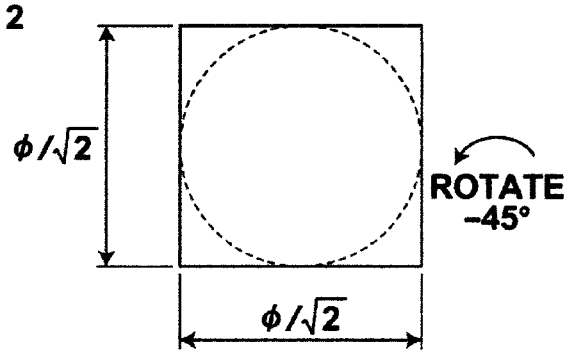
(3)
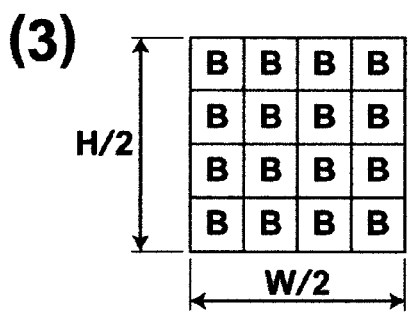
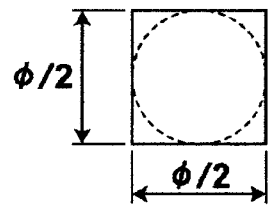

FIG.7
(1)
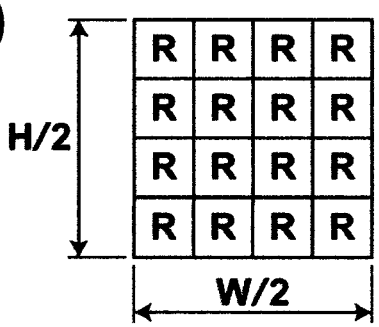
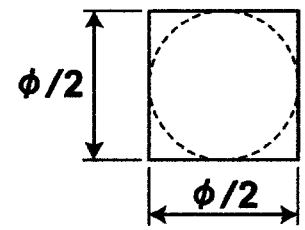
(2)
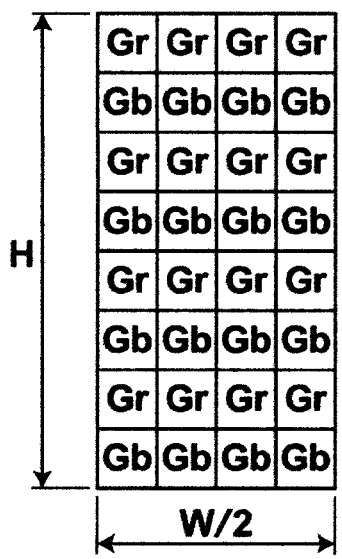
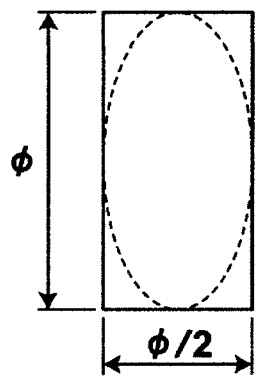
(3)
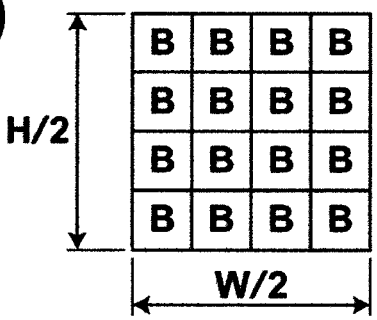
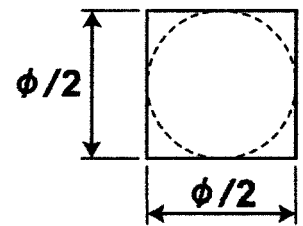

FIG.8
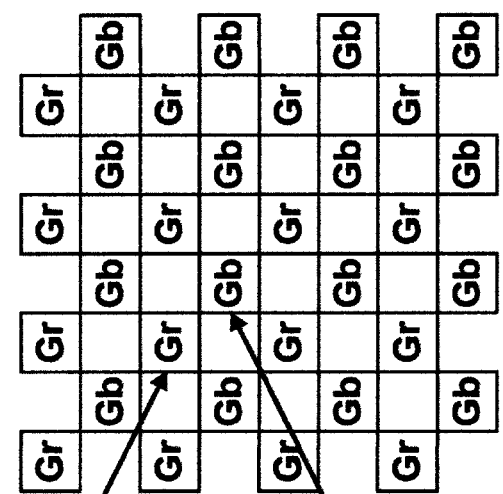
(4)
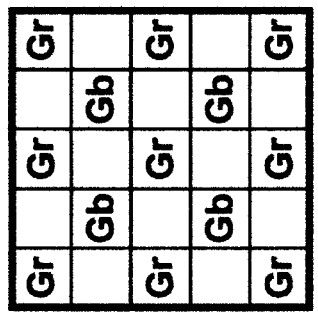
(2)
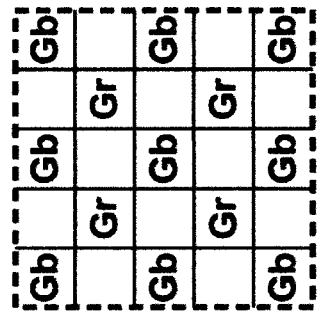
(3)
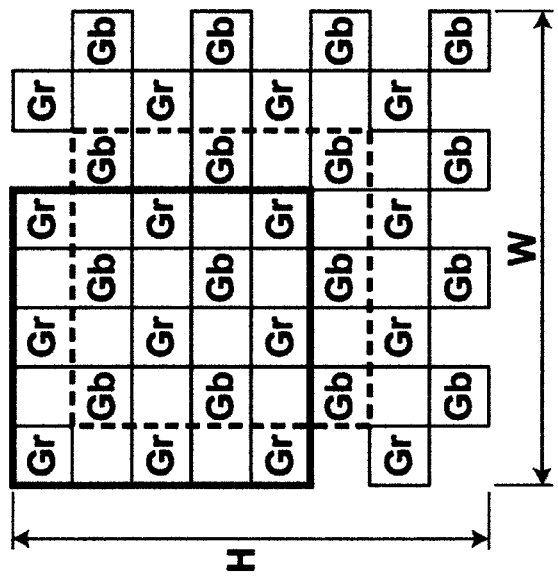
(1)

FIG.9
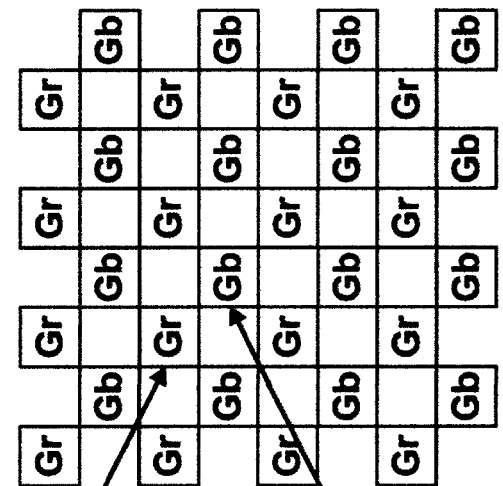
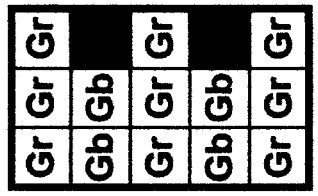
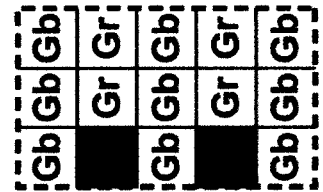
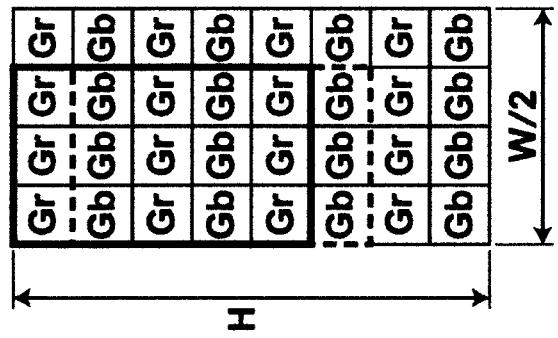

IMAGE DEVICE THAT ACCELERATES RECONSTRUCTION PROCESS

BACKGROUND OF THE INVENTION

1. Field of the Invention

The present invention is related to an imaging device. More particularly, the present invention is related to an imaging device that enables obtainment of color images in a focused state regardless of the distance to a subject.

2. Description of the Related Art

An imaging device has been proposed, in which the spatial frequency properties of a lens optical system are stabilized by inserting a phase plate, and image reconstruction processes, that is, processes in which image signals are passed through reconstructing filters having properties inverse the blur properties of the imaging lens optical systems, are administered to enable obtainment of images in a focused state regardless of the distances to subjects. U.S. Patent Application Publication No. 20090147111 and Japanese Unexamined Patent Publication No. 2009-089082 describe examples of such an imaging device.

It is often the case that the aforementioned type of imaging device employs an imaging element constituted by a CCD or the like, similar to general imaging devices. In this case, a single chip color imaging element, in which a color filter constituted by R (red), G (green), and B (blue) filters for each pixel arranged in a two dimensional matrix is provided on a photoelectric converting section, is often employed, to perform imaging of color images.

U.S. Patent Application Publication No. 20090147111 and Japanese Unexamined Patent Publication No. 2009-089082 propose methods for administering the aforementioned image reconstruction process when using such a single chip color image element in detail.

First, U.S. Patent Application Publication No. 20090147111 proposes to perform the image reconstruction process separately for each of R, G, and B channels. Note that in this proposed method, a Bayer pattern color filter is employed, and therefore, with respect to the G channel, the image reconstruction process is performed on a combined G channel, which is a Gr and Gb channel on which sensitivity correction has been administered and combined. In this reconstruction process, a reconstruction filter is employed that performs convolution such that ¾ of the elements of the R and B channels become zero and ²⁄₄ of the elements of the G channel become zero in a zigzag arrangement.

Meanwhile, Japanese Unexamined Patent Publication No. 2009-089082 proposes to generate a reconstruction filter for data of each of R, Gr, Gb, and B channels, and employing the generated reconstruction filters to independently perform reconstruction processes for each channel, in the case that such a color imaging element is employed.

In the method described in U.S. Patent Application Publication No. 20090147111, calculating processes (branched calculations) are performed for elements of which the value of the reconstruction filter is zero, and therefore it is recognized that there is a problem of high calculation costs. In addition, with respect to memory capacity for storing data of the reconstruction filter, four times the memory capacity is necessary for elements having values other than zero for the R and B channels, and twice the memory capacity is necessary for elements having values other than zero for the G channel. For these reasons, this method is not economical.

Meanwhile, in the method described in Japanese Unexamined Patent Publication No. 2009-089082, convolution calculating processes, which have extremely high calculation costs, are administered for all pixels. Therefore, a problem is recognized that the calculation cost is high in this case as well. In addition, it is known that the G channel greatly influences the perceived resolution of ultimately obtained images. However, because the method described in this patent document performs image reconstruction processes on the Gr channel and Gb channel separately, there is a problem that high frequency components are likely to be lost in reconstructed images.

SUMMARY OF THE INVENTION

The present invention has been developed in view of the foregoing circumstances. It is an object of the present invention to sufficiently reduce calculation costs (calculation time/amount of memory) when obtaining color images employing a single chip color imaging element in an imaging device that enables obtainment of images in a focused state regardless of distances to subjects. It is a further object of the present invention to prevent loss of high frequency components in reconstructed images.

An imaging device of the present invention comprises:

a lens optical system, for focusing light from a subject;

color imaging means equipped with a Bayer pattern color filter, for imaging an image of the subject focused by the lens optical system; and an image processing section, for performing a filtering process in which data output by the imaging means is passed through an image reconstructing filter having properties inverse the blur properties of the lens optical system, then performing a synchronization process;

the image processing section collecting data excluding zero elements for each of R, G, and B channels, to generate reduced data arrays in which the amount of data is ¼ for the R and B channels, and the amount of data is ½ for the G channel, and administering the filtering process using the image reconstruction filter onto data of the reduced data array for each of the R, G, and B channels.

Note that it is desirable for the image processing section to be configured to:

collect data excluding zero elements, and rotates the data array 45 degrees to generate the reduced data array for the G channel;

administer the filtering process employing an image reconstruction filter, of which data have similarly been rotated 45 degrees, onto data that constitutes the reduced data array for the G channel; and rotate the data obtained by the filtering process −45 degrees, to return the orientation of the data array.

Alternatively, the image processing section may be configured to collect data excluding zero elements in one of the horizontal direction and the vertical direction for the G channel.

It is desirable for correction gain, for correcting differences in sensitivities among Gr cells and Gb cells, to be overlapped onto each element of the image reconstruction filter which is employed with respect to data of the G channel.

As described above, the image processing section of the imaging device of the present invention collects data for each of the R, G, and B channels while excluding zero elements. Thereby, reduced data arrays, in which the amounts of data for the R and B channels is ¼, and the amount of data for the G channel is ½, are generated. The filtering process using the image reconstruction filter is performed onto data that constitutes the reduced data arrays for each of the R, G, and B channels. Therefore, zero elements of the image reconstruction filter are eliminated from the calculation processes, which reduces the calculation costs. Further, the configurations of calculating programs and circuits can be simplified.

In addition, the imaging device of the present invention performs the image reconstruction process onto the G channel, which is a combination of the Gr channel and the Gb channel. Therefore, loss of high frequency components which occurs when the Gr channel and the Gb channel are processed separately can be prevented, and a more highly detailed ultimate image can be obtained.

BRIEF DESCRIPTION OF THE DRAWINGS

FIG. 2 is a flow chart that illustrates the steps of image processes performed by the imaging device of FIG. 1.

FIG. 3 is a schematic diagram that illustrates a Bayer pattern image obtained by the imaging device of FIG. 1.

FIG. 4 is a diagram for explaining reduced data arrays for each of R, G, and B channels within the imaging device of FIG. 1.

FIG. 5 is a diagram for explaining the reduced data arrays and image reconstruction filters.

FIG. 7 is a diagram for explaining the reduced data arrays and image reconstruction filters of a second embodiment of the present invention.

FIG. 8 is a diagram for explaining image reconstruction filters and data arrangement following image reconstruction processes in the second embodiment.

FIG. 9 is a diagram for explaining image reconstruction filters and data arrangement following image reconstruction processes in a third embodiment of the present invention.

DESCRIPTION OF THE PREFERRED EMBODIMENTS

Hereinafter, embodiments of the present invention will be described in detail with reference to the attached drawings.

Figure 1:
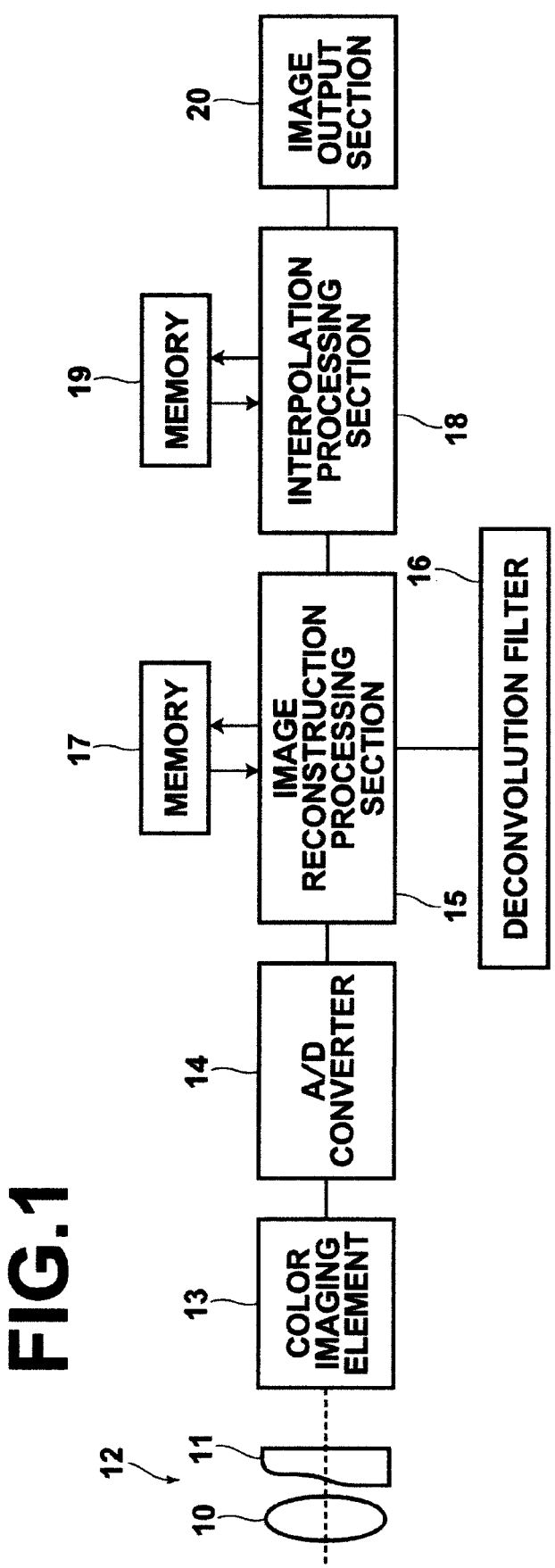
FIG. 1 is a schematic block diagram that illustrates the construction of an imaging device according to an embodiment of the present invention.

FIG. 1 is a schematic block diagram that illustrates the basic construction of a color imaging device according to a first embodiment of the present invention. As illustrated in FIG. 1, the imaging device is equipped with: a lens optical system 12 constituted by a lens 10 and a phase plate 11, for example, for focusing light from a subject; a color imaging element 13 constituted by a CCD, for example, for imaging an image of the subject focused by the lens optical system 12; an A/D converter 14 for digitizing analog output from the color imaging element 13; an image reconstruction processing section 15, for administering an image reconstruction process to reduce image blur onto image data output from the A/D converter 14; deconvolution filters 16 for performing the image reconstruction process; a memory 17 connected to the image reconstruction processing section 15 as a workspace; an interpolation processing section 18, for administering an interpolation process with respect to data output from the image reconstruction processing section 15; a memory 19 connected to the interpolation processing section 18 as a workspace; and an image output section 20, for outputting images based on R, G, and B image data output from the interpolation processing section 18.

Note that in the present embodiment, the aforementioned elements 15 through 19 are constituted by known computer systems. The elements 15 through 19 constitute an image processing section of the present invention. The image output section 20 may be a recording device that records images onto recording media, or display means that displays images employing a CRT, a liquid crystal display panel, etc.

Hereinafter, the processes performed by the image reconstruction processing section 15 and the interpolation processing section 18 will be described with reference to FIG. 2, which illustrates the steps of the processes. When the process starts, the image reconstruction processing section 15 first separates the digital color image data output from the A/D converter into three images, for each of an R, a G, and a B channel (step S1 of FIG. 2). This is illustrated in columns 1 and 2 (counted from the left edge) of FIG. 3.

Here, a single chip color imaging element having a color filter in the Bayer pattern is employed as the color imaging element 13. The images borne by the image data, which are the analog signals output from the color imaging element 13 and digitized by the A/D converter 14, are Bayer pattern images, in which R images, G images (more specifically, Gr images which are alternately arranged with R images and constitute a single line, and Gb images which are alternately arranged with B images and constitute a single line), and B images are arranged, as illustrated in FIG. 3.

In the present embodiment, the number of data in the horizontal direction of the Bayer pattern image is designated as W, and the number of data in the vertical direction is designated as H, as illustrated in FIG. 3. In addition, a point spread is indicated by the circles A drawn by a broken line in FIG. 3. The diameter of the point spread is designated as $\phi$. Note that in the example of FIG. 3, $\phi$ is equivalent to the length of five cells.

Next, the image reconstruction processing section 15 closes the gaps within each of the R, G, and B images, that is, reduces the data array sizes by excluding zero elements (step S2). The reduction of the data array sizes will be described with reference to FIG. 4. As is clear from the Bayer pattern image illustrated in FIG. 3, if the gaps within the images are closed for the R and B channels, the arranged numbers of data will become H/2 in the vertical direction and W/2 in the horizontal direction. Therefore, the reduced data arrays for the R and B channels become those indicated by (1) and (4) in FIG. 4. That is, the reduced data arrays of the R and B channels will have ¼ the number of data of the original image.

Meanwhile, data of the G channel is arranged in the state indicated by (2) of FIG. 4. After the gaps in the image are closed, the data array is rotated 45 degrees. Thereby, the reduced data array indicated by (3) of FIG. 4 is obtained. The number of data in this reduced data array is $H/\sqrt{2}$ in one direction, and $W/\sqrt{2}$ in the direction perpendicular thereto. That is, for the G channel, the number of data in the reduced data array becomes ½ that of the original image.

Next, the image reconstruction processing section 15 administers image reconstruction filtering processes using deconvolution filters 16 having filter sizes corresponding to the size of each array, onto the reduced data arrays obtained in the manner described above for each of the R, G, and B channels (step S3). The deconvolution filters 16 have properties inverse to the blur properties of the lens optical system 12, that is, the point spread function thereof. By performing the filtering processing using the deconvolution filter 16 having such properties, image data that bear images in a focused state, in which blur has been resolved, are obtained. Note that this type of image reconstruction filter is described in detail in U.S. Patent Application Publication No. 20090147111 and Japanese Unexamined Patent Publication No. 2009-089082. Such a known image reconstruction filter may be employed in the present invention.

(1), (2), and (3) of FIG. 5 each denote the filter size (toward the left of the drawing) determined for the R, G, and B channels, respectively, and the diameters of spread of the deconvolution filters 16 (toward the right of the drawing). Note that the diameter of spread of the deconvolution filters 16 are $\phi/2$, $\phi/\sqrt{2}$, and $\phi/2$ for the R, G, and B channels, respectively.

Next, the image reconstruction processing section 15 performs a process to return the data, which have undergone the filtering process, to the Bayer pattern (step S4). Note that with respect to the G channel, data which have undergone the filtering process are rotated −45 degrees to return the orientation of the data array to the original orientation, then returned to the Bayer pattern.

Figure 6:
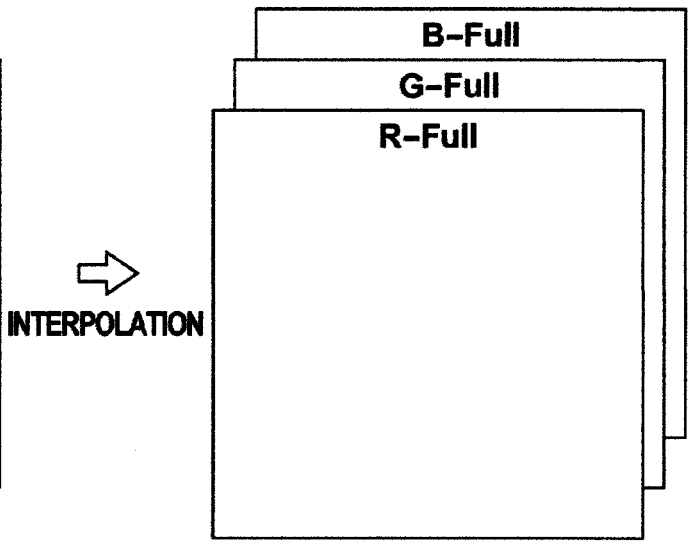
FIG. 6 is a diagram for explaining an image which is ultimately obtained by the imaging device of FIG. 1.

Data which have been returned to the Bayer pattern in this manner are denoted by (1) of FIG. 6. The data, which have been returned to the Bayer pattern, are sent to the interpolation processing section 18 of FIG. 1. The interpolation processing section 18 administers an interpolation process onto the data in the Bayer pattern (step S5). This process is generally referred to as a synchronizing process, and is a process that interpolates spatial shifts among color signals that occur due to color filter arrangement, to calculate color data for each point. Thereby, a three color image signal that represents data for each of three colors R, G, and B is obtained, as denoted by (2) of FIG. 6.

As described above, in the present embodiment, the image reconstruction processing section 15 collects data while excluding zero elements from each of the R, G, and B channels. Thereby, reduced data arrays, in which the amounts of data for the R and B channels is ¼, and the amount of data for the G channel is ½, are generated. The filtering processes using the deconvolution filters 16 are performed onto data that constitutes the reduced data arrays for each of the R, G, and B channels. Therefore, zero elements of the image reconstruction filter are eliminated from the calculation processes, which reduces the calculation costs. Further, the configurations of calculating programs and circuits can be simplified.

In addition, the imaging device of the present invention performs the image reconstruction process onto the G channel, which is a combination of the Gr channel and the Gb channel. Therefore, loss of high frequency components which occurs when the Gr channel and the Gb channel are processed separately can be prevented, and a more highly detailed ultimate image can be obtained.

Further, in the present embodiment, data of the G channel are rotated and rearranged. Therefore, the configurations of the calculating programs and circuits can be further simplified, reducing system costs and calculating costs even more.

Next, a second embodiment of the present invention will be described with reference to FIG. 7. In the second embodiment, the reduced data arrays for the R and B channels denoted by (1) and (3) of FIG. 7 are the same as those illustrated in FIG. 5. However, the reduced data array of the G channel is of an arrangement different from that of FIG. 5. That is, in the second embodiment, data of the G channel are collected while excluding zero elements in the horizontal direction (aligned toward the left in FIG. 7) to generate the reduced data array. In this case, the number of data in the array will become H in the vertical direction and W/2 in the horizontal direction. Accordingly, the number of data is ½ that of the original image.

Note that (1), (2), and (3) of FIG. 7 also denote the diameter of spread of deconvolution filters for each of the R, G, and B channels, respectively toward the right side of the drawing. In this case, the diameters of spread of the deconvolution filters for the R and B channel are both $\phi/2$. The spread becomes elliptical for the G channel, and the length of the major axis is $\phi$, while the length of the minor axis is $\phi/2$.

Here, the deconvolution process to be administered onto the G channel, which is a combination of the Gr and Gb channels will be that as denoted by (1) of FIG. 8 if considered in the original Bayer pattern state. However, the data of the G channel is rearranged into the reduced data array such that the vertical size of is maintained, while the horizontal size is reduced to ½, as illustrated in FIG. 7. Therefore, the positions of corresponding elements of the deconvolution filter will be shifted. This problem can be resolved easily, as will be described hereinbelow. That is, the arrangement of elements of the deconvolution filter is also rearranged, to obtain a filter having a Gr cell at the center as denoted by (2) of FIG. 8, and a filter having a Gb cell at the center as denoted by (3) of FIG. 8. Further, the filter which is employed is switched for cases in which the central element of the convolution process is a Gr element or a Gb element. With respect to the data arrangement following the filtering process, the data may be arranged according to the filter which was utilized, as denoted by (4) of FIG. 8. Note that (2) and (3) of FIG. 8 respectively correspond to the region denoted by the bold solid line and the region denoted by the bold broken line in (1) of FIG. 8.

Next, a third embodiment of the present invention will be described with reference to FIG. 9. In the third embodiment, a reduced data array is generated for the G channel by excluding zero elements while aligning data toward the left, as denoted by (1) of FIG. 9. Then, deconvolution filters having sizes indicated by the bold solid line and by the bold broken line of FIG. 9 are employed to perform image reconstruction processes on data that constitute the reduced data array. That is, in the third embodiment, the elements of the deconvolution filters are arranged such that the Gr rows and Gb rows are shifted by one element, in order to absorb positional differences among Gr data and Gb data in the horizontal direction during image reconstruction processes performed on the G channel, which is the Gr and Gb channels combined.

These deconvolution filters are denoted by (2) and (3) of FIG. 9. The former is that in which a Gr cell is positioned at the center, and the latter is that in which a Gb cell is positioned at the center. In both (2) and (3), the blacked out portions indicate zero elements.

Note that the direction in which the Gr row and the Gb row are shifted is reversed depending on whether the data of the central pixel during the convolution calculation is Gr or Gb. For this reason, the two types of deconvolution filters described above for cases in which the data of the central pixel is Gr and for cases in which the data of the central pixel is Gb. The two types of filters are selectively utilized for the aforementioned two cases during the convolution process. Data obtained by the image reconstruction process using these deconvolution filters may be arranged as illustrated in (4).

Note that correction gain, which are unique values for the Gr cells and the Gb cells, may be overlapped onto each element of the image reconstruction filters denoted by (2) and (3) of FIG. 8, for example. If these image reconstruction filters are used, sensitivity differences among the Gr cells and the Gb cells can be automatically corrected. By adopting this configuration, a separate process that corrects these sensitivity differences is obviated, which is preferable from the viewpoint of expediting image processes.

What is claimed is:
1. An imaging device, comprising:
   a lens optical system, for focusing light from a subject;
   color imaging means equipped with a Bayer pattern color filter, for imaging an image of the subject focused by the lens optical system; and an image processing section, for performing a filtering process in which data output by the color imaging means is passed through an image reconstructing filter having properties inverse blur properties of the lens optical system, then performing a synchronization process;

wherein the image processing section collecting data excludes zero elements for each of R, G, and B channels, to generate reduced data arrays in which the amount of data is ¼ for the R and B channels, and the amount of data is ½ for the G channel, and administering the filtering process using the image reconstruction filter onto data of the reduced data array for each of the R, G, and B channels;

wherein the image processing section is configured to:
- collect data excluding zero elements, and rotates the data array 45 degrees to generate the reduced data array for the G channel;
- administer the filtering process employing an image reconstruction filter, of which data have similarly been rotated 45 degrees, onto data that constitutes the reduced data array for the G channel; and
- rotate the data obtained by the filtering process 45 degrees, to return the orientation of the data array.

2. The imaging device as defined in claim 1, wherein: correction gain, for correcting differences in sensitivities among Gr cells and Gb cells, are overlapped onto each element of the image reconstruction filter which is employed with respect to data of the G channel.

* * * * *